(12) United States Patent
Sasaki et al.

(10) Patent No.: US 6,540,973 B1
(45) Date of Patent: Apr. 1, 2003

(54) PROCESS FOR PRODUCING HYDROGEN CHLORIDE

(75) Inventors: Masakazu Sasaki, Chiba (JP); Tomomichi Tomita, Chiba (JP); Tokuo Oike, Chiba (JP); Yuzuru Yanagisawa, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 0 days.

(21) Appl. No.: 09/513,944

(22) Filed: Feb. 28, 2000

(30) Foreign Application Priority Data

Mar. 31, 1999 (JP) .......................... 11-092005
Oct. 25, 1999 (JP) .......................... 11-302324
Jan. 20, 2000 (JP) .......................... 2000-011554

(51) Int. Cl.⁷ .............................................. C01B 7/07
(52) U.S. Cl. ................... 423/488; 423/481; 423/240 R
(58) Field of Search ........................... 423/488, 481, 423/240 R (56) References Cited

U.S. PATENT DOCUMENTS 3,779,870 A * 12/1973 Gudmundsen et al. ...... 423/488
4,115,530 A * 9/1978 Coenen et al. .............. 423/488
4,259,309 A * 3/1981 Coenen et al. .............. 423/481
4,867,960 A * 9/1989 Tom ............................ 423/488
4,935,220 A * 6/1990 Schneider et al. ........... 423/488

FOREIGN PATENT DOCUMENTS

JP          5021318     7/1975
JP          55067504    5/1980
JP          09086901    3/1997

OTHER PUBLICATIONS

Salt Effects on Vapor–Liquid Equilibria for Volatile Strong Electrolyte–Water Systems; Sako et al.; vol. 17, No. 4, 1984; pp. 381–388 (No month).

Vapor–Pressure Data for Common Acids at High Temperatures; Staples et al.; Chemical Engineering/Nov. 16, 1970; pp. 113–115.

* cited by examiner

Primary Examiner—Ngoc-Yen Nguyen
(74) Attorney, Agent, or Firm—Schmeiser, Olsen & Watts (57) ABSTRACT

The process according to the invention comprises bringing gaseous hydrogen chloride in a non-condensable gas into contact with an absorbing medium selected from water or a dilute aqueous hydrogen chloride solution in an absorption column to cause the medium to absorb the gaseous hydrogen chloride, and subjecting the resultant absorbed solution to distillation in the presence of a salt having a salting-out effect to produce anhydrous hydrogen chloride.

16 Claims, 5 Drawing Sheets

PROCESS FOR PRODUCING HYDROGEN CHLORIDE

FIELD OF THE INVENTION

The invention relates to a process for producing anhydrous hydrogen chloride by the distillation of an aqueous hydrogen chloride solution.

DESCRIPTION OF THE RELATED ART

As is well known, an aqueous hydrogen chloride solution forms in the course of distillation an azeotropic composition of a certain concentration at the distillation pressure. It is thought that the temperature of the azeotropic point increases and the hydrogen chloride concentration in the solution at the azeotropic point decreases as the pressure increases from a reduced pressure to a pressure near atmospheric pressure.

Under such circumstances, a number of liquid-gas equilibrium data for hydrogen chloride-water binary systems are found in the vicinity of the azeotropic points at pressures near atomospheric pressure, as represented by Sako, T., Hakuta, T., Yoshitome, H., J.Chem. Eng. Jpn., vol. 17, 381(1984). However, very few liquid-gas equilibrium data are found except in the vicinity of the azeotropic points.

Among literatures disclosing gas-liquid equilibrium data of the high pressure systems are Kao, J. T. F., J. Chem. Eng. Data, vol. 15, No. 3,362(1970) and Staple, B. G., Procopio Jr., J. M., Chem. Eng., November 16, 113(1970).

The former discloses data in which the highest hydrogen chloride concentration is 44.6 wt. %, the highest temperature is 70° C., and the highest pressure is 15 bar A (absolute). The latter discloses data in which the highest hydrogen chloride concentration is 35 wt. %, the highest temperature is 230° C., and the highest pressure is 7 MPa A.

Now, on the basis of the foregoing literatures, it has been proposed to recover a highly concentrated aqueous hydrogen chloride solution and produce anhydrous hydrogen chloride through distillation from crude hydrogen chloride generated as byproducts in many chemical processes and from crude hydrogen chloride obtained by the thermal decomposition of waste liquors containing organic chlorides formed in the production process of vinyl chloride resins.

Examples thereof include a process combining a vacuum distillation with a pressure distillation disclosed in Japanese Patent Publication No. 21318/1975, a process combining an adiabatic absorption with a distillation disclosed in Japanese Patent Laid-Open No. 67504/1980, a process for producing anhydrous hydrogen chloride disclosed in Japanese Patent Laid-Open No. 86901/1997, and the lice.

The above-mentioned compounds containing chlorine are burned in an incinerator, and the resultant waste gas containing hydrogen chloride is recovered in a waste gas boiler and treated as a gas at about 350° C. (referred to as a feed gas hereunder).

Figure 5:
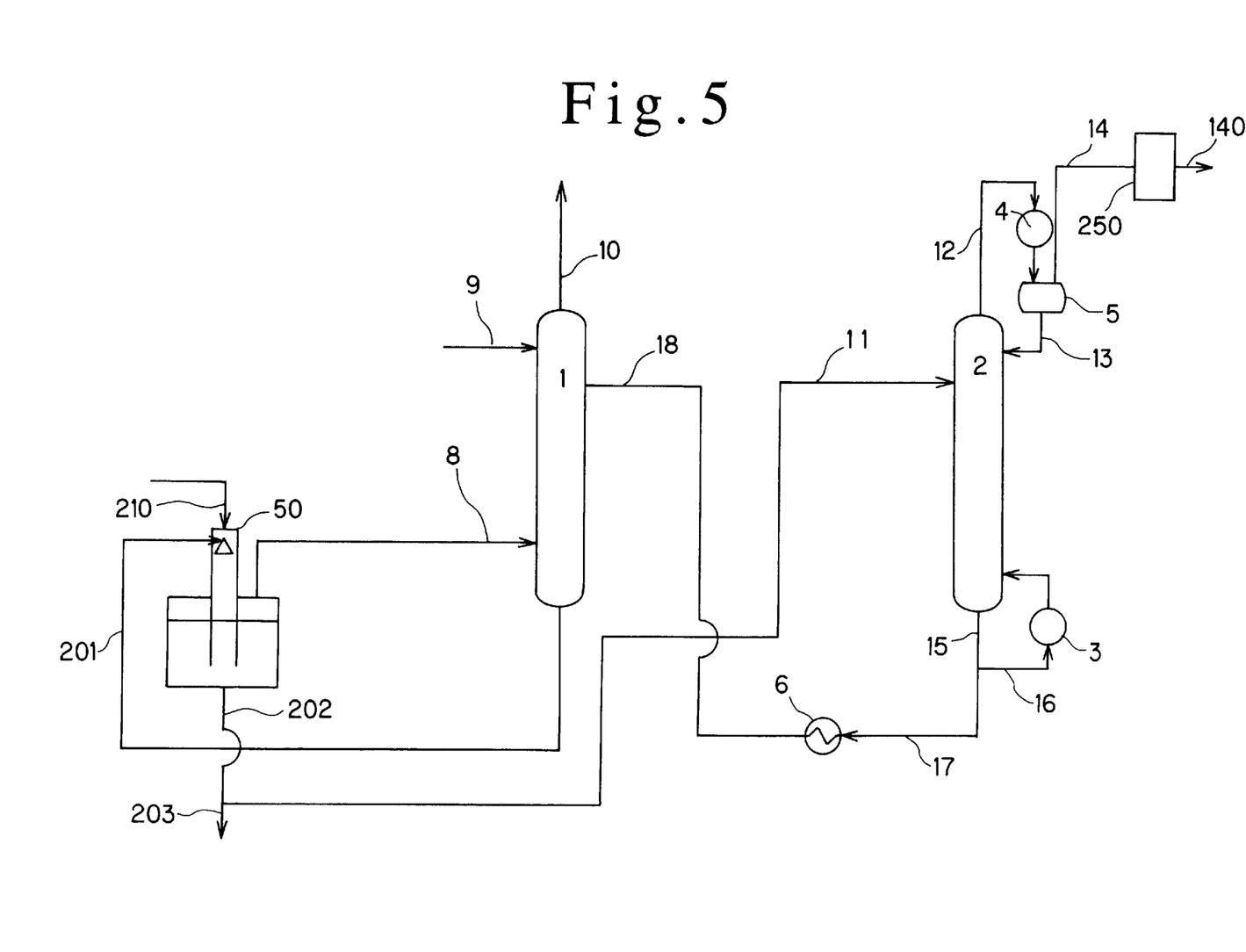
FIG. 5 is a flowsheet showing an embodiment of the prior art.

FIG. 5 is a flowsheet showing an embodiment of a conventional process. Using FIG. 5, a process disclosed in Japanese Patent Publication No. 21318/1975 is illustrated.

In FIG. 5, the aforementioned feed gas containing hydrogen chloride and the bottom solution of an absorption column 1 are supplied to a quencher 50 through lines 210 and 201, respectively. In the quencher 50, hydrogen chloride in the feed gas containing the hydrogen chloride is partially absorbed in the bottom solution of the absorption column 1, and the resultant absorbed solution is supplied to a distillation column 2 through lines 202 and 11. At this time, the absorbed solution through the line 202 contains iron ions and the like so that part of the absorbed solution is periodically taken out through a line 203.

The feed gas from which the hydrogen chloride is partially removed is introduced through a line 8 into the absorption column 1, and water or a dilute aqueous hydrogen chloride solution is fed through a line 9 provided at the upper part of the absorption column 1. The liquid is brought into contact with the gas in the column by way of packings, plates or trays (not shown) to absorb the remaining hydrogen chloride. The crude aqueous hydrogen chloride solution collecting in the bottom of the absorption column 1 is sent to the distillation column 2 through lines 201, 202 and 11. The feed gas from which the remaining hydrogen chloride is removed is passed through a line 10 to be treated separately.

In the distillation column 2, distilled vapor from the top of the column is fed to a receiver 5 through a line 12 and condenser 4, and the condensate is refluxed through a line 13. Gaseous hydrogen chloride is sent at atmospheric pressure −0.2 MPa G (gauge) through a line 14 to a compressor 250 where it is pressurized to 0.4–0.7 MPa G to be converted to pressurized anhydrous hydrogen chloride, which is used separately as feed materials for other processes.

The process according to the above-described publication is composed of an absorption column and a distillation column, and hence it is simple process wise. However, in view of the relationship between the operating pressure in the distillation column and the operating temperature at the bottom of the column, the operating pressure has to be limited to atmospheric pressure −0.2 MPa G so that the operating temperature may not exceed a temperature against which the material of the distillation column can stand.

As-described above, processes using anhydrous hydrogen chloride as a feed material, such as vinyl chloride production processes, need an operating pressure of 0.4–0.7 MPa G. Therefore, it has been necessary to supply the feed material by increasing its pressure to the operating pressure by means of a compressor 250. In this case, however, the compressor 250 has suffered damage of corrosion.

The process for producing anhydrous hydrogen chloride disclosed in Japanese Patent Laid-Open No. 86901/1997 uses two distillation columns and comprises: a first step in which a feed material of an aqueous hydrogen chloride solution with a concentration above the hydrogen chloride concentration at the azeotropic point of water and hydrogen chloride under the operating pressure is fed to a first distillation column to distill it at a pressure of from atmospheric pressure to 0.2 MPa G so as to obtain a dilute aqueous hydrogen chloride solution of the azeotropic composition at the bottom and highly concentrated gaseous hydrogen chloride at the top; a second step in which an aqueous hydrogen chloride solution formed by condensing the highly concentrated gaseous hydrogen chloride obtained in the first distillation column is fed to a second distillation column to distill it at a pressure exceeding 0.2 MPa G and a temperature of 160° C. or below so as to obtain anhydrous hydrogen chloride at the top and an aqueous hydrogen chloride solution with a concentration somewhat higher than the azeotropic composition corresponding to the aforesaid pressure at the bottom; and a third step in which the aqueous hydrogen chloride solution obtained at the bottom of the second distillation column is fed to the first distillation column. The publication describes that it is preferable to use steel or the like with a fluoroplastic lining applied as the material of the first distillation column and an impermeable graphite material as the material of the second distillation column. However, since it is not realistic from industrial viewpoints to use the expensive impermeable graphite material, it has been demanded not to use the material.

As described above, it has been expected to develop a process for producing anhydrous hydrogen chloride which permits the temperature at the bottom of the distillation column to remain in the range of temperatures at which the cheap materials formerly employed can be used, even if the operating pressure of the distillation column is increased to 0.4–0.7 MPa G or higher.

SUMMARY OF THE INVENTION

It is an object of the present invention to provide a process for producing anhydrous hydrogen chloride which permits the temperature at the bottom of the distillation column to remain in the range of temperatures at which the formerly employed cheap materials can be used, even if the operating pressure of the distillation column is increased to 0.4 MPa G or higher.

The present inventors have made intensive investigations to allow the bottom temperature to remain in the range of temperatures at which the formerly employed cheap materials can be used, even if the pressure of the distillation column is increased. As a result, such a salting-out effect has been observed that when an aqueous hydrogen chloride solution, to which a salt selected from neutral or basic alkaline earth metal chlorides or alkali metal chlorides is added, is distilled at atmospheric pressure, the temperature at the bottom of the distillation column is significantly reduced unexpectedly as compared with the case where no salt is added, in obtaining the same gaseous hydrogen chloride distillate. As a result of further intensive investigations, it has been found that the same salting-out effect is observed even under pressure.

The present invention has been completed on the basis of these findings, and the object of the invention is achieved by the means described below.

A process for producing anhydrous hydrogen chloride comprising subjecting an aqueous hydrogen chloride solution to distillation, wherein the distillation is carried out in the presence of a salt having a salting-out effect in the aqueous hydrogen chloride solution.

A process for producing anhydrous hydrogen chloride comprising bringing a feed gas comprising gaseous hydrogen chloride and a non-condensable gas into contact with at least one absorbing medium selected from water or a dilute aqueous hydrogen chloride solution in an absorption column to cause the absorbing medium to absorb the gaseous hydrogen chloride, and distilling the resultant absorbed solution in a distillation column to produce anhydrous hydrogen chloride, wherein the absorbed solution fed to the distillation column contains a salt having a salting-out effect.

A process for producing anhydrous hydrogen chloride comprising bringing a feed gas comprising gaseous hydrogen chloride and a non-condensable gas into contact with at least one absorbing medium selected from water or a dilute aqueous hydrogen chloride solution in an absorption column to cause the absorbing medium to absorb the gaseous hydrogen chloride, feeding the resultant absorbed solution dividedly to a first distillation column and to a condenser provided above the first distillation column, distilling in the first distillation column the absorbed solution fed thereto, bringing into the condenser the gas from the head of the first distillation column into contact with the absorbed solution fed to the condenser to cause the gas to condense, and distilling the resultant condensate in a second distillation column to produce anhydrous hydrogen chloride, wherein the absorbed solution fed to the first distillation column and the condenser contains a salt having a salting-out effect.

DESCRIPTION OF THE PREFERRED EMBODIMENTS

In the present invention, an aqueous hydrogen chloride solution is distilled in the presence of a salt having a salting-out effect, for example, a neutral or basic alkaline earth metal chloride or alkali metal chloride. As the hydrogen chloride, that discharged from a variety of processes may be used, and it is also possible to use in the present invention aqueous hydrogen chloride solutions obtained by bringing various non-condensable gases containing hydrogen chloride into contact with water or a dilute aqueous hydrogen chloride solution in an absorption column to cause the liquid to absorb the hydrogen chloride. When the non-condensable gas containing hydrogen chloride is of a high temperature, it may be quenched with water or an aqueous hydrogen chloride solution so as to be sent to the absorption column.

No limitation is imposed on the site for the addition of the salt having a salting-out effect, because it is sufficient if only the salt is present in the solution at the bottom of the distillation column. Accordingly, the salt can be added at various stages. For example, it is possible to add the salt to water or a dilute aqueous hydrogen chloride solution to be introduced into the absorption column or to an absorbed solution to be introduced into the distillation column.

The concentration of the salt having a salting-out effect in an aqueous hydrogen chloride solution subjected to distillation is preferably 5–25 wt. %, particularly 6–18 wt. %.

The vapor pressure of hydrogen chloride over an aqueous hydrogen chloride solution is increased in accordance with the presence of the aforesaid salt. This phenomenon makes it possible to increase the distillation pressure of an aqueous hydrogen chloride solution without increasing the operating temperature. Therefore, the operating pressure of the distillation column can be increased even with cheap polymer materials that have hitherto been employed. Such a salting-out effect can be controlled by selecting properly the kind and amount of the salt contained in the solution.

When a salt having the salting-out effect is present in an absorbing medium for absorbing hydrogen chloride from a feed gas containing the hydrogen chloride, the salt may exert an adverse effect on the absorption operation. This effect is, however, negligibly small in the range of operating temperatures for the absorption column.

In the production of anhydrous hydrogen chloride according to the present invention, an aqueous hydrogen chloride solution which has a hydrogen chloride concentration higher than the hydrogen chloride concentration at the azeotropic point of hydrogen chloride and water at the pressure of the distillation column, is subjected to distillation.

The distillation of an aqueous hydrogen chloride solution may be carried out in one stage or in two stages comprising a first distillation preferably at a pressure of 0.05–0.2 MPa G and a second distillation preferably at a pressure of 0.4 MPa G or higher and a bottom temperature of 150° C. or lower.

The present invention is illustrated hereinbelow with reference to the drawings. Numbers or signs used in FIGS. 1 to 5 are common.

Figure 1:
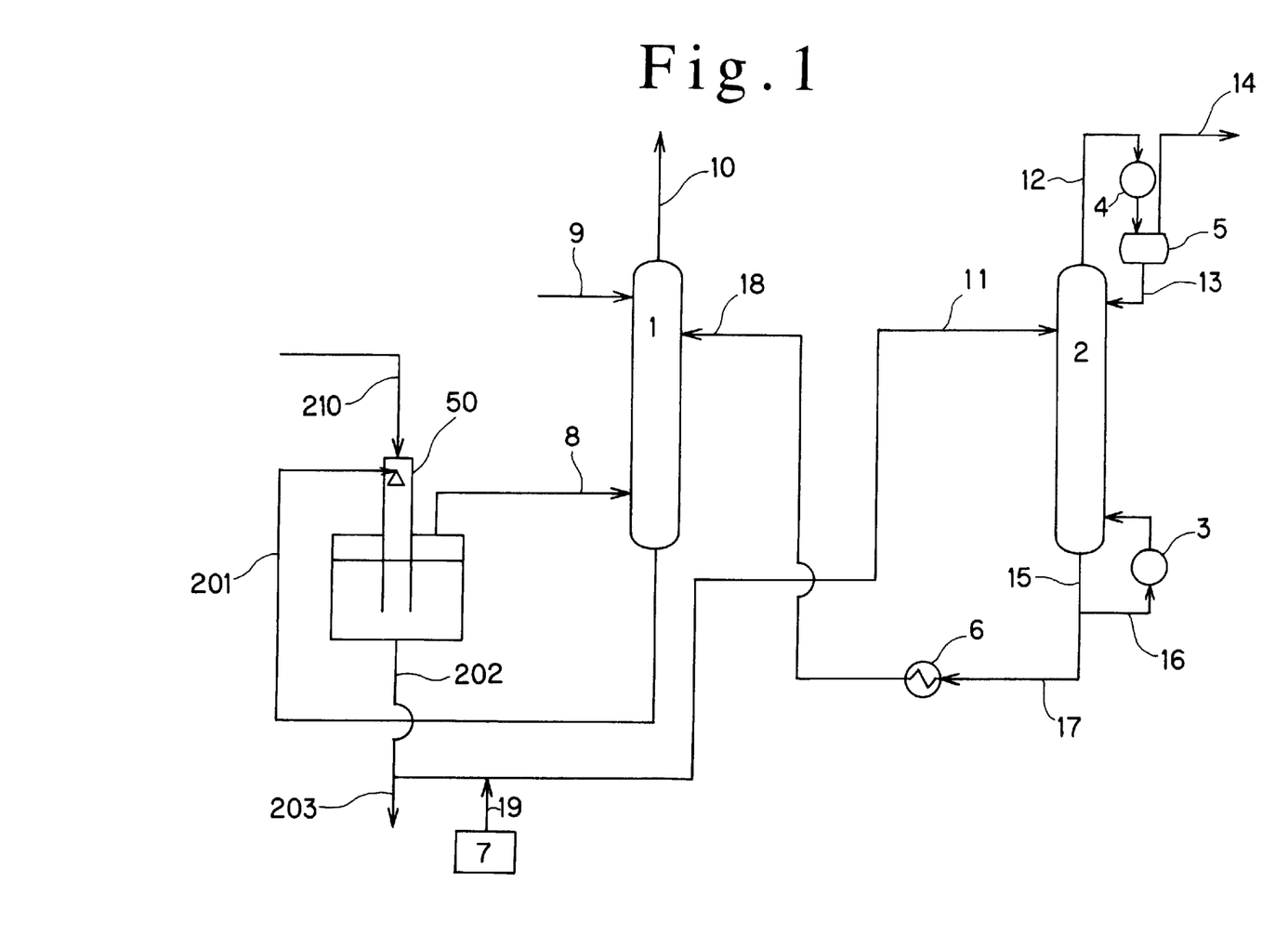
FIG. 1 is a flowsheet showing an embodiment of the present invention.

FIG. 1 is a flowsheet showing an embodiment of the present invention. In FIG. 1, a feed gas containing hydrogen chloride and a bottom solution of an absorption column 1 are supplied to a quencher 50 through lines 210 and 201, respectively. In the quencher 50, part of hydrogen chloride in the feed gas containing the hydrogen chloride is absorbed in the bottom solution of the absorption column 1. The resulting absorbed solution, sent through lines 202 and 11, is combined with a salt 7 fed through a line 19 and supplied to a distillation column 2 in the state of dissolving the salt 7. The hydrogen chloride concentration of the absorbed solution is higher than the hydrogen chloride concentration at the azeotropic point of hydrogen chloride and water at the pressure of the distillation column. At this time, since the foregoing absorbed solution contains iron ions and the like, part of the absorbed solution is periodically purged through a line 203 as is done in the prior art processes.

The feed gas from which the hydrogen chloride is partially removed is introduced into the absorption column 1 through a line 8, and water or a dilute aqueous hydrogen chloride solution is fed through a line 9 arranged at the upper part of the absorption column 1 to absorb the remaining hydrogen chloride. The feed gas with the hydrogen chloride removed is discharged through a line 10 so as to be treated separately.

At this time, the absorbing liquid is combined with a solution from the bottom of a below-described distillation column 2 fed through a line 17, cooler 6 and line 18 to form a crude aqueous hydrogen chloride solution collecting in the bottom of the absorption column 1. The crude aqueous hydrogen chloride solution, which contains the salt having the salting-out effect, is sent to the quencher 50 through the line 201 from the bottom of the absorption column 1 to absorb hydrogen chloride. The resulting absorbed solution is blown periodically through the line 203 branched from the line 202 as described above. A salt 7 corresponding to the salt blown through the lines 203 is supplied through the line 19. This is the same also in FIG. 3 illustrated below.

The salt having the salting-out effect may include preferably neutral or basic alkaline earth metal chlorides or alkali metal chlorides. Alkaline earth metal chlorides are preferred to alkali metal chlorides, and Ca, Mg and Ba which are relatively cheap may be selected as the alkaline earth metals. It goes without saying that these metals may be used alone or as a mixture.

Figure 2:
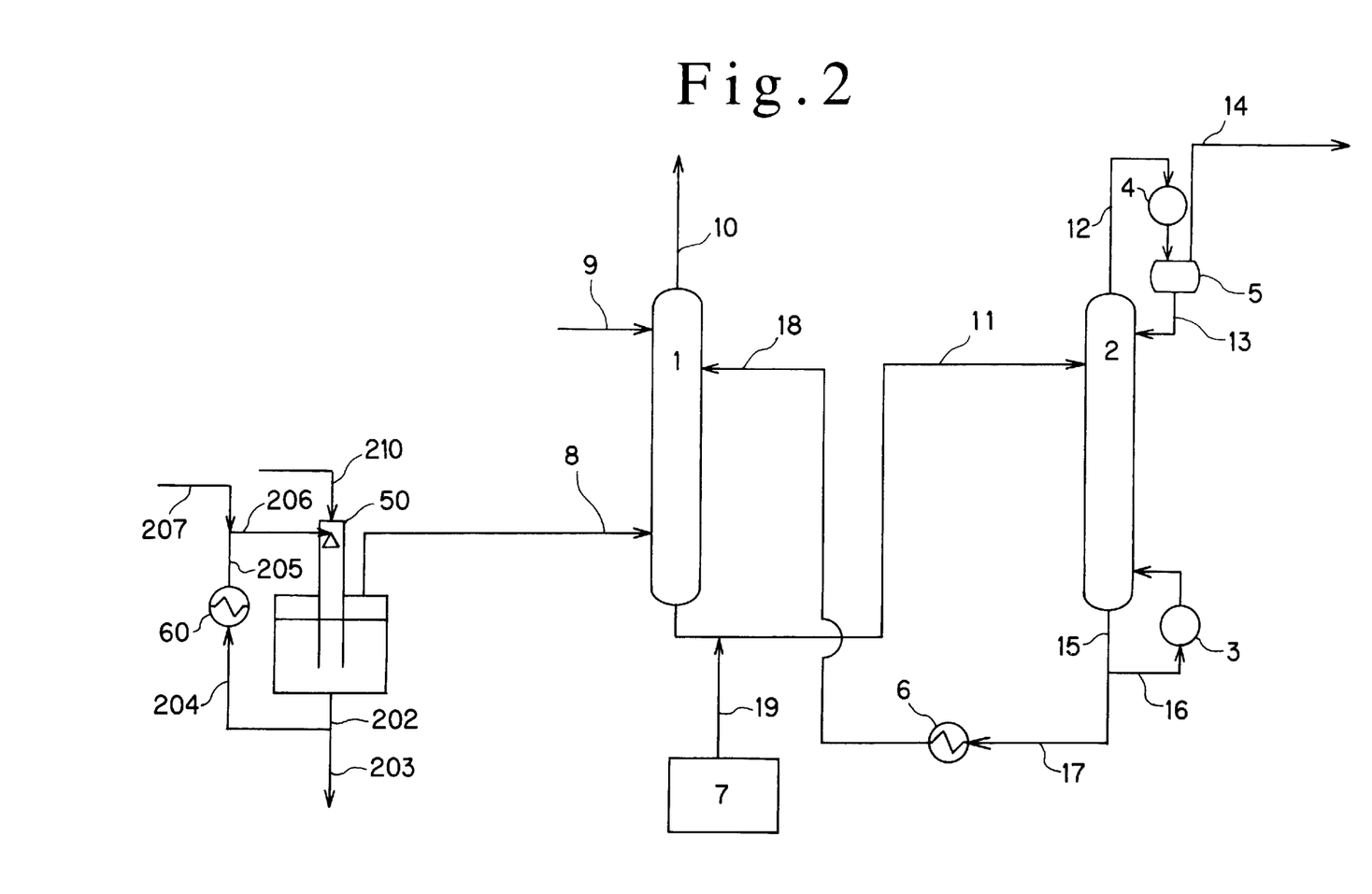
FIG. 2 is a flowsheet showing another embodiment of the present invention.
Figure 3:
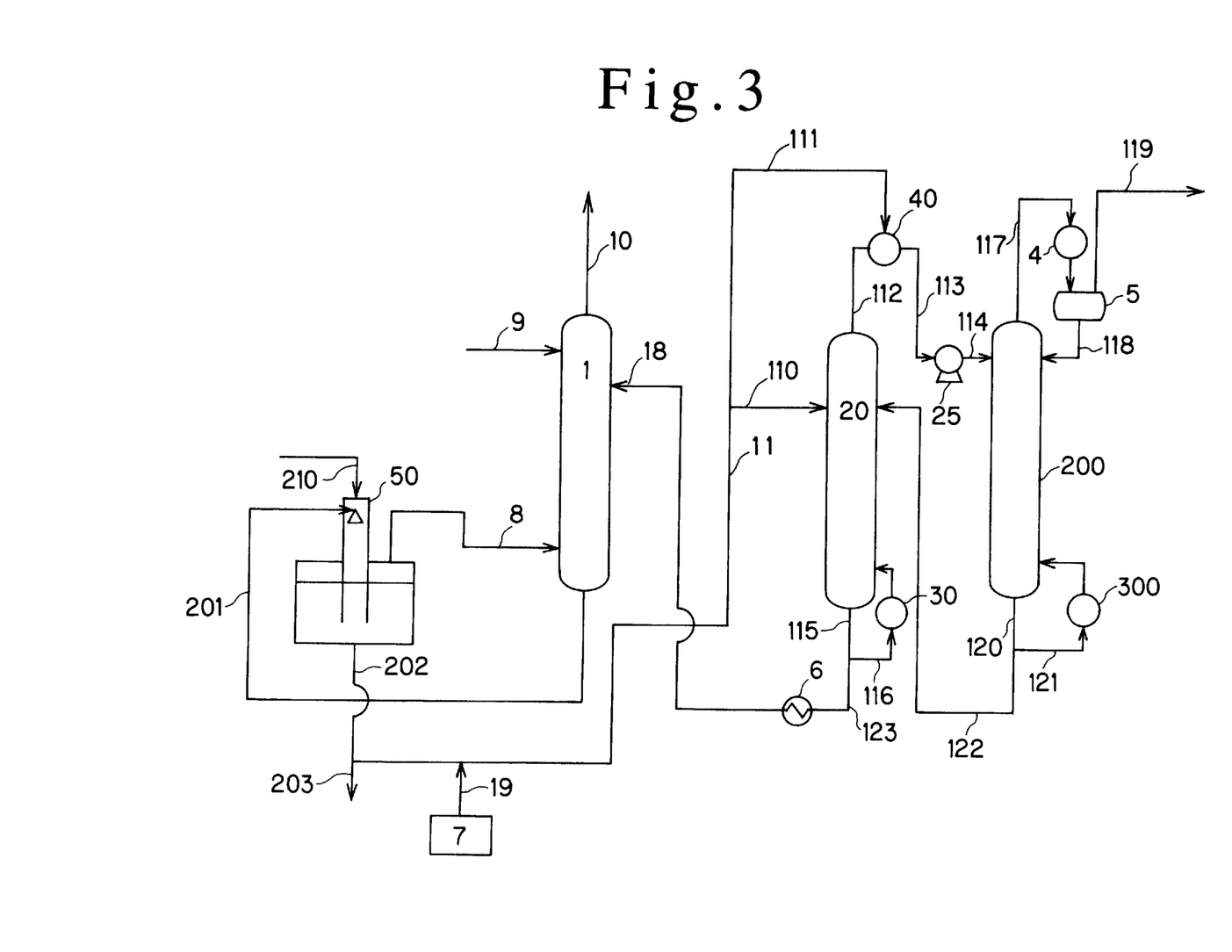
FIG. 3 is a flowsheet showing a further embodiment of the present invention.
Figure 4:
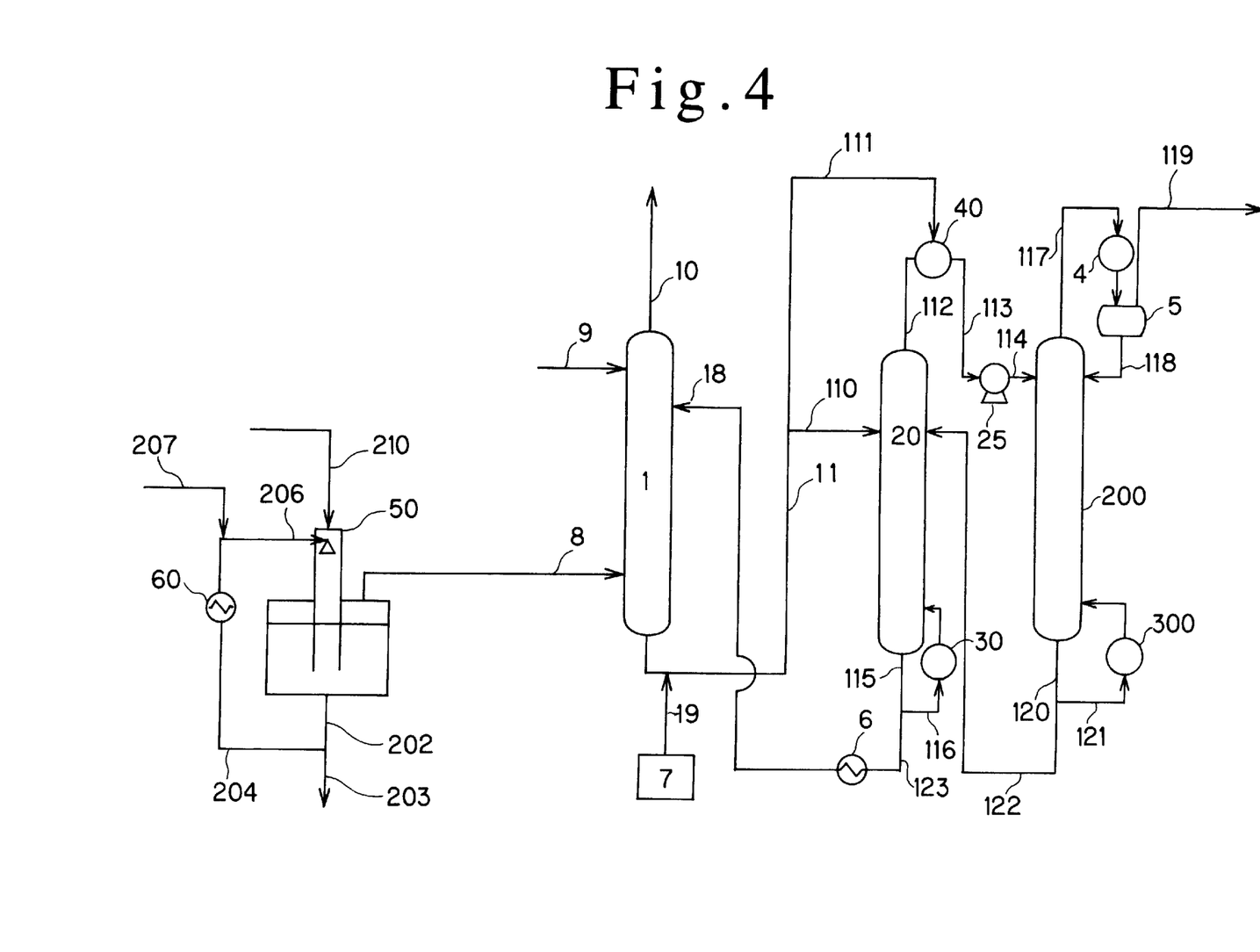
FIG. 4 is a flowsheet showing a still further embodiment of the present invention.

It is the same also in FIGS. 2–4 illustrated below.

The concentration of the salt having the salting-out effect varies with the solubility of the salt in the aqouous hydrogen chloride solution, but may be selected in such a way that it should be below the solubility of the salt dissolving in the aqueous hydrogen chloride solution at the operating temperature and that no solid should be deposited at the concentration when the solution is cooled. In other words, the concentration should be below the solubility of the salt in the aqueous hydrogen chloride solution within the operating system at the lowest temperature in the system. Specifically, the foregoing range of concentrations may preferably be employed.

It is the same also in FIGS. 2–4 illustrated below.

The crude aqueous hydrogen chloride solution containing the salt sent through the line 11 is pressurized to 0.4–0.7 MPa G by a pump (not shown) and sent at a temperature of 60–80° C. to the distillation column 2, where it is distilled under the conditions of a pressure of 0.4–0.7 MPa G and a bottom temperature of about 142–143° C. by heating it in a reboiler 3 arranged at the bottom of the distillation column. Thus, gaseous anhydrous hydrogen chloride of 0.4–0.7 MPa G is obtained through a line 12, condenser 4, receiver 5 and line 14 from the top of the column 2.

On the other hand, an aqueous hydrogen chloride solution from the bottom, having a temperature of about 142–143° C., is sent through lines 15 and 17, cooled to about 35–50° C. in a cooler 6, and fed to the absorption column 1 through a line 18.

The distillation column 2 is applied with a lining such as fluoroplastic lining for its use. With such a lining, the distillation column 2 suffers no particular trouble even if it is used at 150° C. or below, particularly at about 142–143° C. regardless of the concentration of the aqueous hydrogen chloride solution. This is the same also in a first distillation column 20 and second distillation column 200 described in detail below.

As regards the operating pressure of the distillation column 1, a pressure of 0.4–0.7 MPa G is generally selected. However, the operating pressure is not limited to these pressures. Needless to say, a pressure of 0.7 MPa G or above, for example, 0.7–1.5 MPa G may be selected.

FIG. 2 is a flowsheet showing another embodiment of the present invention. In the process of FIG. 1, part of the salt is taken out at the same time when part of the absorbed solution is taken out in order to purge iron ions and the like from the solution whereas in the process of FIG. 2, no salt is taken out at the time of the purging. The present invention is illustrated with reference to FIG. 2 hereinbelow.

In FIG. 2, a feed gas containing hydrogen chloride, a quencher solution from a quencher 50, and water are fed to the quencher 50 through a line 210, through lines 202 and 204, cooler 60 and line 205, and through a line 207, respectively. The amount of the water fed through the line 207 will suffice if it can reduce the load of the cooler 60 described below.

The quencher solution, sent through lines 202 and 204, is introduced generally at 60–80° C. into the cooler 60 where it is cooled to 35–70° C. The solution then passes through a line 205 and is combined with the water through the line 207 so that it is recycled to the quencher 50 through a line 206.

It is similarly carried out to the prior art process to purge periodically part of the quencher solution through a line 203 branched from the line 202 because it contains iron ions and the like. In FIG. 2, the salt 7 according to the present invention is not present in the solution purged through the line 203. This is the same also in FIG. 4 described below.

The feed gas from which the hydrogen chloride is partially removed is introduced into an absorption column 1 through a line 8, and water or a dilute aqueous hydrogen chloride solution is fed through a line 9 provided at the upper part of the absorption column 1 to absorb the remaining hydrogen chloride, while on the other hand the feed gas with the hydrogen chloride removed is discharged through a line 10 to be treated separately.

The resultant absorbed solution is combined with a solution fed through a line 17, cooler 6 and line 18 from the bottom of a distillation column 2 described below to form a crude aqueous hydrogen chloride solution collecting in the bottom of the absorption column 1. The absorbed solution, containing a salt 7 having a salting-out effect supplied through a line 19 at the time of starting operation, is fed to a distillation column 2 through a line 11 from the bottom of the absorption column 1. Needless to say, it is generally not necessary to supply the salt 7 during operation. This is the same also in FIG. 4 described below.

The absorbed solution containing the salt sent through he line 11 is pressurized to 0.4–0.7 MPa G by a pump (not shown) and supplied at a temperature of 70–80° C. to the installation column 2 where it is distilled under the conditions of a pressure of preferably 0.4–0.7 MPa G and a bottom temperature of preferably about 142–143° C. by heating it in a reboiler 3 provided at the bottom of the distillation column 2. Thus, gaseous anhydrous hydrogen chloride of 0.4–0.7 MPa G is obtained through a line 12, condenser 4, receiver 5 and line 14 from the top of the column 2.

On the other hand, an aqueous hydrogen chloride solution of about 142–143° C. discharged from the bottom of the column 2 is sent through lines 15 and 17 to a cooler 6 where it is cooled to about 35–50° C., and fed to the absorption column 1 through a line 18.

FIG. 3 is a flowsheet showing a further embodiment of the present invention. The present invention is described with reference to FIGS. 3 and 1.

In FIG. 3, a feed gas containing hydrogen chloride and an absorbed solution from an absorption column 1 are supplied to a quencher 50 through a line 210 and a line 201, respectively. In the quencher 50, part of hydrogen chloride in the feed gas containing the hydrogen chloride is absorbed in the bottom solution of the absorption column 1. The resultant absorbed solution, sent through lines 202 and 11, is combined with a salt 7 fed through a line 19, so that it is supplied to a distillation column 20 in the state of dissolving the salt 7. At this time, since the absorbed solution through the line 202 contains iron ions and the like, part of the absorbed solution is periodically purged through a line 203 branched from the line 202, and a salt 7 in the amount corresponding to that of the salt purged through the line 203 is supplied through a line 19, as is carried out in the process described in FIG. 1.

On the other hand, the feed gas from which the hydrogen chloride is partially removed is introduced into the absorption column 1 through a line 8, and water or a dilute aqueous hydrogen chloride solution is fed through a line 9 arranged at the upper part of the absorption column 1 to absorb the remaining hydrogen chloride. The feed gas with the hydrogen chloride removed is discharged through a line 10 so as to be treated separately, as is carried out in the process described in FIG. 1.

Then, the bottom solution of the first distillation column 20 is fed through a line 115, line 123, cooler 6 and line 18 to the absorption column 1, where it is combined with the water or dilute aqueous hydrogen chloride solution fed through the line 9 to absorb the remaining gaseous hydrogen chloride, forming an absorbed solution (a crude aqueous hydrogen chloride solution) collecting in the bottom of the absorption column 1.

The crude aqueous hydrogen chloride solution containing the salt sent through the line 11 at practically atmospheric pressure and a temperature of 60–80° C. is dividedly fed through a line 110 to the first distillation column 20 and through a line 111 branched from the line 11 to a condenser 40 provided above the first distillation column 20. The solution fed to the first distillation column 20 is distilled therein under the conditions of a pressure of 0.05–0.2 MPa G and a bottom temperature of about 125–143° C. by heating it in a reboiler 30 provided at the bottom of the first distillation column 20. Highly concentrated gaseous hydrogen chloride from the top of the first distillation column 20 is condensed in the condenser 40 by being brought into contact with the crude aqueous hydrogen chloride solution containing the salt sent to the condenser 40 to form a condensate, which is then fed through a line 113, pump 25 and line 114 to a second distillation column 200 as a highly concentrated aqueous hydrogen chloride solution containing the salt.

On the other hand, a dilute aqueous hydrogen chloride solution of about 125–143° C. from the bottom of the first distillation column 20 is sent through lines 115 and 123 to a cooler 6 where it is cooled to 35–50° C., and recycled to the absorption column 1 through the line 18.

The highly concentrated aqueous hydrogen chloride solution containing the salt fed to the second distillation column 200 is distilled in the column 200 under the conditions of a pressure of 0.4–1.5 MPa G, preferably 0.7–1.0 MPa G and a temperature of 130–150° C., preferably 135–145° C., more preferably 140–143° C. by being heated in a reboiler 300 at the bottom of the distillation column 200. The bottom solution is returned to the first distillation column 20 through lines 120 and 122. Separately, gaseous anhydrous hydrogen chloride of 0.4–1.5 MPa G is obtained through a line 117, condenser 4, receiver 5 and line 119.

FIG. 4 is a flow sheet showing a still further embodiment of the present invention. In FIG. 3, the salt is taken out together with the absorbed solution purged whereas in FIG. 4, no salt is taken out together with the absorbed solution purged. The present invention is illustrated with reference to FIGS. 4 and 2 hereunder.

In FIG. 4, a feed gas containing hydrogen chloride, a quencher solution from a quencher 50 and water are sent to the quencher 50 through a line 210, through a line 202, line 204, cooler 60 and line 205, and through a line 207, respectively. The amount of the water fed through the line 207 will suffice if it can reduce the load of the cooler 60 described below, as is the case with the process of FIG. 2.

The quencher solution is introduced generally at 60–80° C. through the lines 202 and 204 into the cooler 60, where it is cooled to 35–70° C. The solution thus cooled is fed through a line 205, combined with the water sent through the line 207, and fed through a line 206 to the quencher 50 again.

Since the solution in a line 203 branched from the line 202 contains iron ions and the like, part of the solution is periodically purged through the line 203 in the same manner as in the process of FIG. 2. Similarly to the process shown in FIG. 2, the salt 7 according to the present invention is not contained in the solution through the line 203 in FIG. 4.

Separately, the feed gas from which the hydrogen chloride is partially removed is introduced into an absorption column 1 through a line 8, and water or a dilute aqueous hydrogen chloride solution is fed through a line 9 arranged at the upper part of the absorption column 1 to absorb the remaining hydrogen chloride. The feed gas with the hydrogen chloride removed is discharged through a line 10 to be treated separately.

The solution from the bottom of the first distillation column 20 is fed through a line 115, line 123, cooler 6 and line 18 to the absorption column 1 where it is combined with the water or dilute aqueous hydrogen chloride solution sent through the line 9 to absorb the remaining gaseous hydrogen chloride, forming a crude aqueous hydrogen chloride solution collecting in the bottom of the absorption column 1.

The absorbed solution (crude aqueous hydrogen chloride solution) containing the salt sent through the line 11 at practically atmospheric pressure and a temperature of 70–80° C. is fed dividedly through a line 110 to a first distillation column 20 and through a line 111 branched from the line 11 to a condenser 40 arranged above the first distillation column 20. The absorbed solution sent to the first distillation column 20 is distilled therein under the conditions of a pressure of 0.05–0.2 MPa G and a bottom temperature of about 125–143° C. by heating it in a reboiler 30 arranged at the bottom of the first distillation column 20. Highly concentrated gaseous hydrogen chloride from the top of the first distillation column 20 is condensed in a condenser 40 by being brought into contact with the absorbed solution containing the salt sent to the condenser 40 to form a condensate, which is then fed through a line 113, pump 25 and line 114 to a second distillation column 200 as a highly concentrated aqueous hydrogen chloride solution containing the salt.

A dilute aqueous hydrogen chloride solution of about 125–143° C. from the bottom of the first distillation column 20 is sent through lines 115 and 123 to a cooler 6 where it is cooled to 35–50° C., and returned to the absorption column 1 through the line 18.

The highly concentrated aqueous hydrogen chloride solution containing the salt fed to the second distillation column 200 is distilled therein under the conditions of a pressure of 0.4–1.5 MPa G, preferably 0.7–1.0 Mpa G and a bottom temperature of 130–150° C., preferably 135–145° C., more preferably 140–143° C. by heating it in a reboiler 300 provided at the bottom of the distillation column 200. The bottom solution is recycled to the first distillation column 20 through lines 120 and 122, while gaseous anhydrous hydrogen chloride of 0.4–1.5 MPa G is obtained through a line 117, condenser 4, receiver 5 and line 119.

The present invention is specifically described with reference to the following examples. It goes without saying that the present invention is not limited only to these examples.

EXAMPLE 1

An operation was carried out in accordance with FIG. 1. A feed gas containing hydrogen chloride, which is generated by burning a waste liquid containing chlorinated organic compounds in a chemical plant, is introduced into an absorption column 1 through a line 8, and water is fed through a line 9 arranged at the upper part of the absorption column 1 to absorb the hydrogen chloride. The composition of a crude aqueous hydrogen chloride solution through a line 11 was 25 wt. % in hydrogen chloride concentration and its feed rate was 18.2 t/h. The crude aqueous hydrogen chloride solution contained 17 wt. % of $CaCl_2$ as a salt having a salting-out effect. The crude aqueous hydrogen chloride solution was sent through the line 11 at a temperature of 70° C. to a distillation column 2, where it was distilled under the conditions of a pressure of 0.5 MPa G and a bottom temperature of 143° C. by being heated in a reboiler 3 arranged at the bottom of the distillation column 2. Gaseous anhydrous hydrogen chloride of 0.5 MPa G was obtained from the top of the column 2 through a line 12, condenser 4, receiver 5 and line 14.

Separately, the aqueous hydrogen chloride solution in the bottom of the column 2, whose hydrogen chloride concentration was 25 wt. %, was sent through line 15 and 17 to a cooler 6 where it was cooled to 50° C., and fed to the absorption column 1 through a line 18.

The operating conditions and results of the foregoing process are described in Table 1.

TABLE 1

| Signs | Example 1 | Example 2 | Example 3 | Example 4 | Comp. Ex. 1 | Comp. Ex. 2 | Example 5 | Example 6 |
|---|---|---|---|---|---|---|---|---|
| Kind of salt Absorption column 1 | $CaCl_2$ | $MgCl_2$ | $CaCl_2$ | $MgCl_2$ | — | — | $CaCl_2$ | $CaCl_2$ |
| pressure (MPa G) Distillation column 2 | 0.01 | 0.01 | 0.01 | 0.01 | 0.01 | 0.01 | 0.01 | 0.01 |
| pressure (MPa G) bottom temp. (° C.) Distillation column 20 | 0.50 143 | 0.50 143 | — — | — — | 0.23 143 | 0.50 165 | 0.50 143 | — — |
| pressure (MPa G) bottom temp. (° C.) Distillation column 200 | — — | — — | 0.15 133 | 0.15 133 | — — | — — | — — | 0.15 133 |
| pressure (MPa G) bottom temp. (° C.) Line 210 (feed gas) | — — | — — | 1.0 143 | 1.0 143 | — — | — — | — — | 0.15 143 |
| flow rate (t/h) temperature (° C.) Line 11 | 16.0 350 | 16.0 350 | 16.0 350 | 16.0 350 | 16.0 350 | 16.0 350 | 16.0 350 | 16.0 350 |
| flow rate (t/h) HCl concn. (salt free) (wt. %) pressure (MPa G) temperature (° C.) salt concn. (wt. %) Line 14 | 18.2 25 0.01 70 17 | 17.6 25 0.01 70 14 | 21.4 24 0.01 70 8.5 | 21 24 0.01 70 6.7 | 15.1 25 0.01 70 0 | 15.1 25 0.01 70 0 | 18.2 25 0.01 61 17 | 21.4 24 0.01 61 8.5 |

TABLE 1-continued

| Signs | Example 1 | Example 2 | Example 3 | Example 4 | Comp. Ex. 1 | Comp. Ex. 2 | Example 5 | Example 6 |
|---|---|---|---|---|---|---|---|---|
| flow rate (t/h) | 1.0 | 1.0 | — | — | 1.0 | 1.0 | 1.0 | — |
| HCl conc. (wt. %) | 100 | 100 | — | — | 100 | 100 | 100 | — |
| Line 18 | | | | | | | | |
| flow rate (t/h) | 17.1 | 16.5 | 20.2 | 19.8 | 14 | 14 | 17.1 | 20.2 |
| HCl concn. (salt free) (wt. %) | 20 | 20 | 20 | 20 | 20 | 20 | 20 | 20 |
| pressure (MPa G) | 0.50 | 0.50 | 0.15 | 0.15 | 0.23 | 0.50 | 0.50 | 0.15 |
| temperature (° C.) | 50 | 50 | 50 | 50 | 50 | 50 | 50 | 50 |
| salt concn. (wt. %) | 18 | 15 | 9.1 | 7.3 | 0 | 0 | 1.8 | 9.1 |
| Line 110 | | | | | | | | |
| flow rate (t/h) Line 111 | — | — | 8.9 | 8.7 | — | — | — | 8.9 |
| flow rate (t/h) Line 113 | — | — | 12.5 | 12.3 | — | — | — | 12.5 |
| flow rate (t/h) | — | — | 17.5 | 17.3 | — | — | — | 17.5 |
| HCl concn. (salt free) (wt. %) | — | — | 34.3 | 34.3 | — | — | — | 34.3 |
| pressure (MPa G) | — | — | 0.14 | 0.14 | — | — | — | 0.14 |
| temperature (° C.) | — | — | 65 | 65 | — | — | — | 65 |
| salt concn. (wt. %) | — | — | 6.1 | 4.9 | — | — | — | 6.1 |
| Line 119 | | | | | | | | |
| flow rate (t/h) | — | — | 1.0 | 1.0 | — | — | — | 1.0 |
| HCl conc. (wt. %) | — | — | 100 | 100 | — | — | — | 100 |
| Line 122 | | | | | | | | |
| flow rate (t/h) | — | — | 16.5 | 16.3 | — | — | — | 16.5 |
| HCl concn. (salt free) (wt. %) | — | — | 30 | 30 | — | — | — | 30 |
| pressure (MPa G) | — | — | 1.0 | 1.0 | — | — | — | 1.0 |
| temperature (° C.) | — | — | 143 | 143 | — | — | — | 143 |
| salt concn. (wt. %) | — | — | 6.5 | 5.2 | — | — | — | 6.5 |
| Line 19 | | | | | | | | |
| make-up salt (t/h) Line 8 | 0.23 | 0.18 | 0.14 | 0.08 | — | — | 0 | 0 |
| temperature (° C.) Line 207 | 65 | 65 | 65 | 65 | 65 | 65 | 60 | 60 |
| mak-up water (t/h) | — | — | — | — | — | — | 0.4 | 0.4 |

HCl concn. (salt free) (wt. %) = [(HCl mass in solution)/[(HCl mass in solution) + (water mass in solution)] × 100

EXAMPLE 2

An operation was carried out in the same manner as in Example 1 except that $CaCl_2$ of 17 wt. % in Example 1 was replaced by $MgCl_2$ of 14 wt. %.

The operating conditions and the results are also described in Table 1.

Comparative Example 1

An operation was carried out in the same manner as in Example 1 except that the concentration of $CaCl_2$ in Example 1 was changed from 17 wt. % to 0 wt. % and the pressure from 0.5 MPa G to 0.23 MPa G. The operating conditions and the results are also described in Table 1.

Comparative Example 2

An operation was carried out in the same manner as in Example 1 except that the concentration of $CaCl_2$ in Example 1 was changed to 0 wt. %. The operating conditions and the results are also described in Table 1.

EXAMPLE 3

An operation was carried out in accordance with FIG. 3. A feed gas containing hydrogen chloride, which was generated by burning a waste liquid containing chlorinated organic compounds in a chemical plant, was introduced into an absorption column 1 through a line 8, and water was sprayed through a line 9 arranged at the upper part of the absorption column 1 to absorb the hydrogen chloride. The composition of a crude aqueous hydrogen chloride solution through a line 11 was 24 wt. % as hydrogen chloride and its feed rate was 21.4 t/h. The crude aqueous hydrogen chloride solution contained 8.5 wt. % of $CaCl_2$ as the salt having the salting-out effect.

The crude aqueous hydrogen chloride solution containing the salt sent through the line 11 at 70° C. was dividedly supplied through a line 110 to a distillation column 20 and through a line 111 branched from the line 11 to a condenser 40 arranged above the first distillation column 20. The respective flow rates were 8.9 t/h and 12.5 t/h. The solution fed to the first distillation column 20 was distilled therein under the conditions of a pressure of 0.15 MPa G and a bottom temperature of 143° C. Highly concentrated gaseous hydrogen chloride from the top of the first distillation column 20 was condensed in the condenser 40 to form a condensate, which was combined with the absorbed solution containing the salt sent to the condenser 40 and fed through a line 113, pump 25 and line 114 to a second distillation column 200 as a highly concentrated aqueous hydrogen chloride solution containing the salt.

On the other hand, a dilute aqueous hydrogen chloride solution of 143° C. from the bottom of the first distillation column 20 was sent through lines 115 and 123 to a cooler 6 where it was cooled to 50° C., and returned to the absorption column 1 through the line 18.

The highly concentrated aqueous hydrogen chloride solution containing the salt fed to the second distillation column 200 was distilled therein under the conditions of a pressure of 1.0 MPa G and a bottom temperature of 143° C. The bottom solution was recycled to the first distillation column 20 through lines 120 and 122, while gaseous anhydrous hydrogen chloride of 1.0 MPa G was obtained through a line 117, condenser 4, receiver 5 and line 119.

The operating conditions and the results are also described in Table 1.

EXAMPLE 4

An operation was carried out using $MgCl_2$ in place of $CaCl_2$ in Example 3.

The operating conditions and the operation results are also described in Table 1.

EXAMPLE 5

An operation was carried out according to FIG. 2.

The operating conditions and the operation results are also described in Table 1.

EXAMPLE 6

An operation was carried out according to FIG. 4.

The operating conditions and the operation results are also described in Table 1.

The process for producing anhydrous hydrogen chloride according to the present invention gives effects described below.

(1) Owing to the presence of a salt having a salting-out effect, the distillation column can be operated at a temperature of around 140° C. even under a pressure of 0.4 MPa G or higher. Consequently, it has become possible to use aforementioned cheap materials as the material of the distillation column.

(2) Since the distillation step can be operated at a pressure of 0.4 MPa G or higher even in one distillation column, it has become possible to omit the compressor used in the prior art to pressurize anhydrous hydrogen chloride to this pressure, so that the compression step can be omitted to reduce the compression energy, and, moreover, the corrosion problem originated in the compressor can entirely be eliminated.

(3) Use of two distillation columns has made it possible to operate the distillation step even at a pressure considerably higher than 0.4 MPa G, that is an operating pressure formerly used. Therefore, the pressure of anhydrous hydrogen chloride can be adjusted, without using a compressor, to the pressure conditions of processes in which the anhydrous hydrogen chloride is used as a feed material.

(4) The process can also be operated without purging the salt having the salting-out effect.

What is claimed is:

1. A process, comprising: subjecting an aqueous hydrogen chloride solution to distillation in first and second distillation stages, wherein the first distillation stage is carried out in the presence of a salt having a salting-out effect in said aqueous hydrogen chloride solution, wherein a pressure of the second distillation stage is 0.4 MPa G or higher and a bottom temperature of the second distillation stage is 150° C. or below, and wherein the distillation yields substantially anhydrous hydrogen chloride gas.

2. A process for producing anhydrous hydrogen chloride comprising bringing a feed gas wherein the feed gas includes a gaseous hydrogen chloride and a non-condensable gas into contact with at least one absorbing medium selected from water or a dilute aqueous hydrogen chloride solution in an absorption column to cause said absorbing medium to absorb said gaseous hydrogen chloride, and distilling the resultant absorbed solution in first and second distillation columns to produce anhydrous hydrogen chloride, wherein the absorbed solution fed to said first distillation column contains a salt having a salting-out effect and wherein a pressure of the second distillation column is 0.4 MPa G or higher and a bottom temperature of the second distillation column is 150° C. or below, and wherein the distillation yields substantially anhydrous hydrogen chloride gas.

3. The process according to claim 2, wherein said feed gas is quenched with water or a dilute aqueous hydrogen chloride solution and then brought into contact with said absorbing medium in the absorption column.

4. The process according to claim 2, wherein said dilute aqueous hydrogen chloride solution is a bottom solution of said distillation.

5. The process according to claim 3, wherein the dilute aqueous hydrogen chloride solution used for said quenching is an absorbed solution from said absorption column, and the absorbed solution, used to quench said feed gas, is subjected to the distillation.

6. A process for producing anhydrous hydrogen chloride comprising bringing a feed gas comprising gaseous hydrogen chloride and a non-condensable gas into contact with at least one absorbing medium selected from water or a dilute aqueous hydrogen chloride solution in an absorption column to cause said absorbing medium to absorb said gaseous hydrogen chloride, feeding the resultant absorbed solution dividedly to a first distillation column and to a condenser provided above the first distillation column, distilling in the first distillation column the absorbed solution fed thereto, bringing in said condenser the gas from the head of the first distillation column into contact with the absorbed solution fed to said condenser to cause said gas to condense, and subjecting the resultant condensate to distillation in a second distillation column to produce anhydrous hydrogen chloride, wherein the absorbed solution fed to said first distillation column and said condenser contains salt having a salting-out effect and wherein a pressure of said second distillation stage is 0.4 MPa G or higher and a bottom temperature of said distillation is 150° C. or below, and wherein the distillation yields substantially anhydrous hydrogen chloride gas.

7. The process according to claim 6, wherein said feed gas of a high temperature is guenched with water or a dilute aqueous hydrogen chloride solution and then brought into contact with said absorbing medium in the absorption column.

8. Process according to claim 6, wherein said dilute aqueous hydrogen chloride solution is a bottom solution obtained from the bottom of said first distillation column and having a composition near an azeotropic composition of water and hydrogen chloride.

9. The process according to claim 6, wherein the bottom solution of said second distillation column is introduced into the top part of said first distillation column to distill the same.

10. The process according to claim 1, wherein said salt having the salting-out effect is at least one salt selected from neutral and basic alkaline earth metal chlorides and alkali metal chlorides.

11. The process according to claim 2, wherein said salt having the salting-out effect is at least one salt selected from neutral and basic alkaline earth metal chlorides and alkali metal chlorides.

12. The process according to claim 6, wherein said salt having the salting-out effect is at least one salt selected from neutral and basic alkaline earth metal chlorides and alkali metal chlorides.

13. The process according to claim 1, wherein the distillation is carried out in the presence of from about 6 to about 18 percent by weight of the salt having a salting-out effect in said aqueous hydrogen chloride solution.

14. The process according to claim 2, wherein the resultant absorbed solution has from about 6 to about 18 percent by weight of a salt having the salting-out effect in the aqueous hydrogen chloride solution.

15. The process according to claim 6, wherein the resultant condensate subjected to distillation in the second column includes from about 4.9 to 6.1 percent by weight of a salt having the salting-out effect in the aqueous hydrogen chloride solution.

16. The process of claim 6, wherein the resultant absorbed solution has from about 6 to about 18 percent by weight of a salt having the salting-out effect in the aqueous hydrogen chloride solution.

* * * * *

UNITED STATES PATENT AND TRADEMARK OFFICE
CERTIFICATE OF CORRECTION

PATENT NO. : 6,540,973 B1 Page 1 of 1
DATED : April 1, 2003
INVENTOR(S) : Sasaki et al.

It is certified that error appears in the above-identified patent and that said Letters Patent is hereby corrected as shown below:

Column 1,
Line 52, delete "lice" and insert -- like --.

Column 2,
Line 35, delete the hyphen between "as" and "described".

Signed and Sealed this

Twelfth Day of August, 2003

JAMES E. ROGAN
*Director of the United States Patent and Trademark Office*